June 3, 1969 B. W. RAU 3,447,759
COLLAPSIBLE FILM REEL
Filed May 19, 1967 Sheet 1 of 2
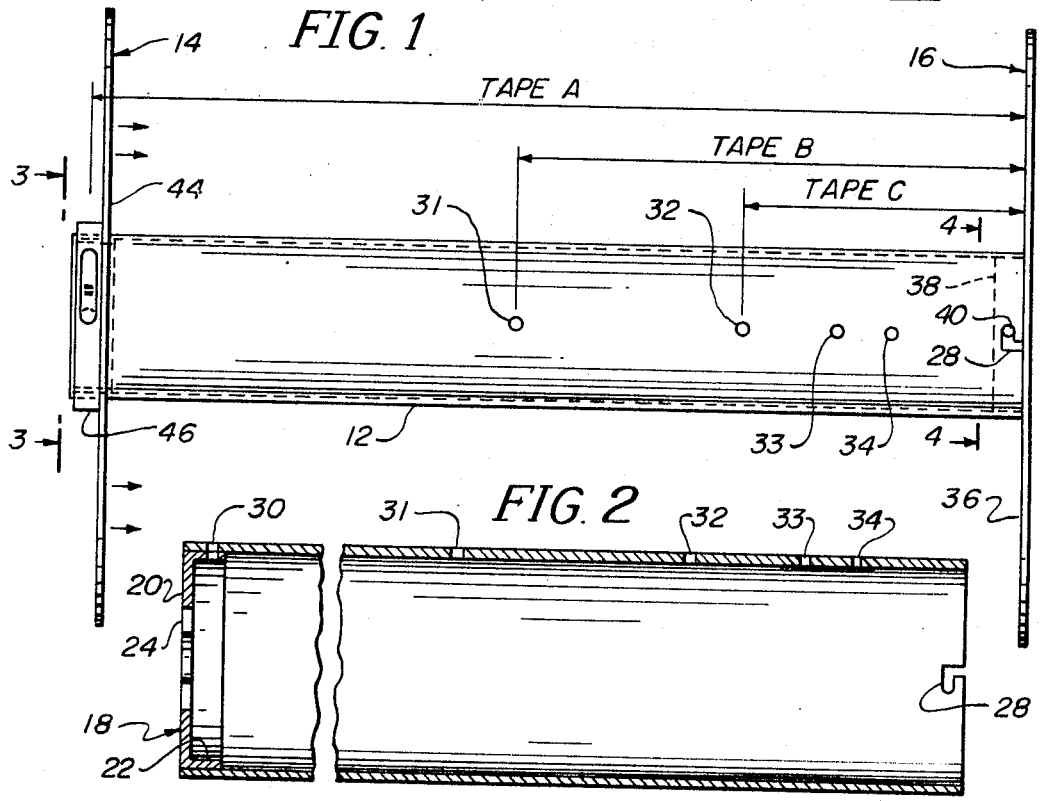
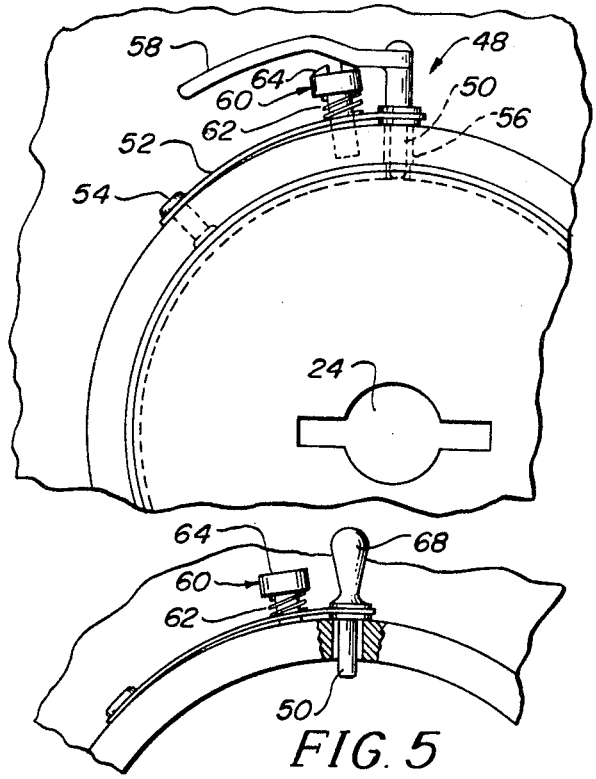
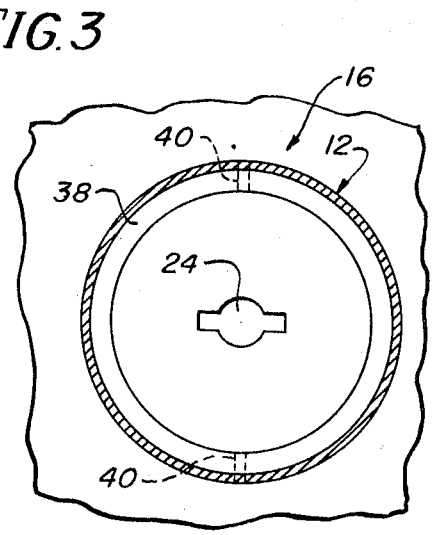
INVENTOR.
BEN W. RAU
BY Dominik, Stein & Knechtel
ATTY'S.

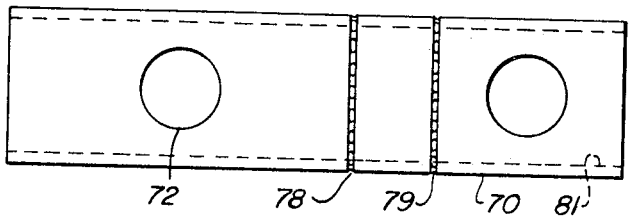
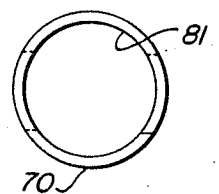
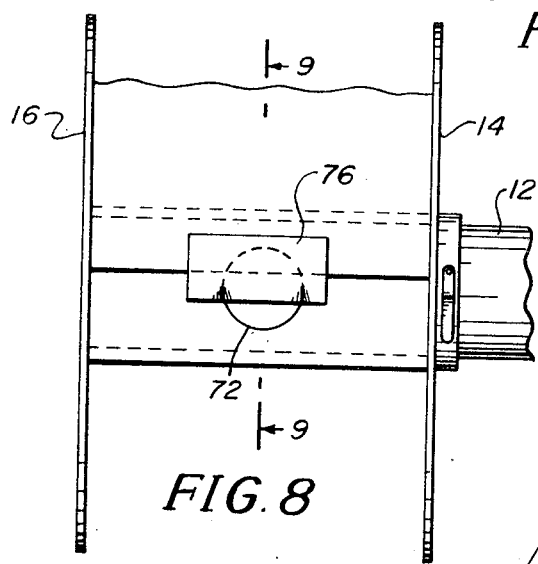
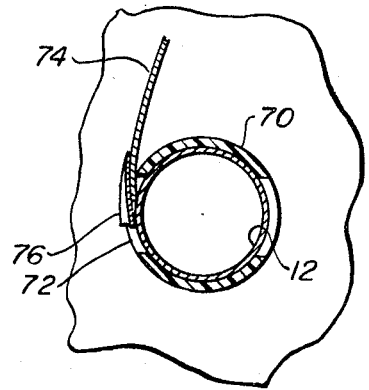
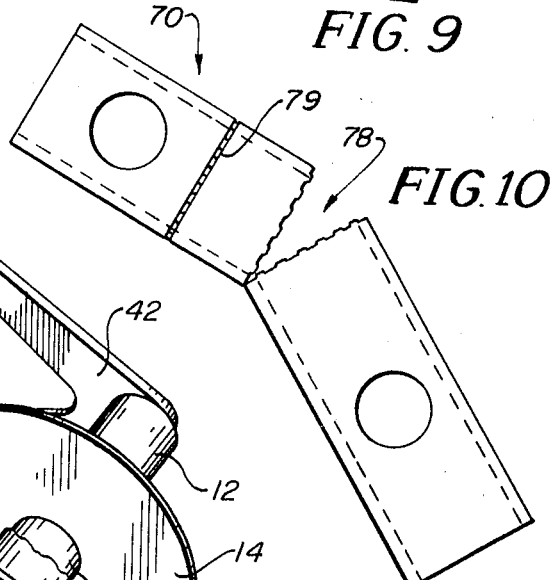
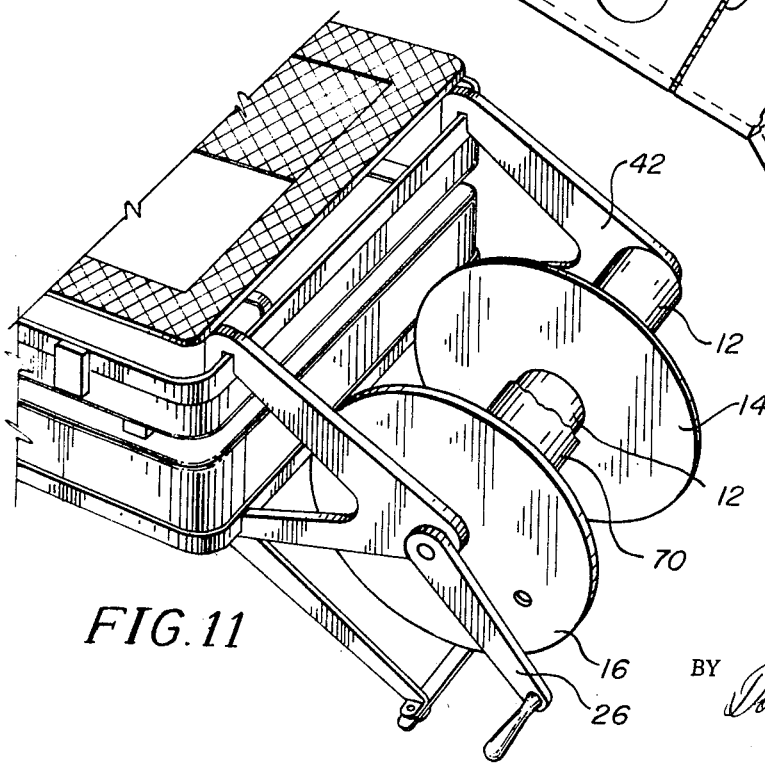
INVENTOR.
BEN W. RAU

United States Patent Office 3,447,759
Patented June 3, 1969

3,447,759
COLLAPSIBLE FILM REEL
Ben W. Rau, 1535 Knollwood, Highland Park, Ill. 60035
Filed May 19, 1967, Ser. No. 639,705
Int. Cl. B65h 75/18
U.S. Cl. 242—71.9
6 Claims

ABSTRACT OF THE DISCLOSURE

A collapsible film reel having a pair of end plates which are removably affixed to a tubular spool. One of the end plates further is adapted to be positionably adjustable on the spool, with respect to the other one of the end plates so as to provide a spacing therebetween substantially corresponding to a particular size, in width, film.
A disposable weakened tubular core can be slidably fitted over the spool, after removing one of the end plates. The film is wound on the disposable core and the latter can be easily removed from the spool, for both storing the film thereon for later use and for disposing of the film, without the necessity of rewinding the film.

---

This invention relates, in general, to improved film reels and, in particular, to improved collapsible film reels.

The collapsible film reel of the present invention is particularly applicable for use with the portable film reader light table disclosed in the U.S. patent application Ser. No. 639,706, filed May 19, 1967, since the film reel can be collapsed and compactly stored, either within the light table when assembled or collapsed for transporting it or, alternatively, with a separate carrying case. Its utility is not limited to this particular application, however, as will be apparent from the description below.

In many cases, particularly when reading aerial reconnaissance photographic film, the film is immediately disposed of by burning or otherwise destroying it, after it has been read. In the past, it has always been necesary to unwind the film from the takeup reel before disposing of it since the takeup reels generally form a permanent part of the viewing apparatus or are themselves of a permanent construction. In other cases, the film is to be retained and, in the past, the film therefore also had to be rewound on the supply reel, for the same reason that the takeup reels are a permanent part of the viewing apparatus.

The collapsible film reel of the present invention is further adapted to receive a disposable core upon which the film can be wound. The core, and hence the film, is easily removed from the takeup reel, for both storing the film for later use and for disposing of the film without the necessity of rewinding the film.

The collapsible film reel and the core both are further adapted to be adjustable, for use with various size, in width, films such as, for example, 16 mm., 35 mm. and 70 mm. film, in addition to film which is 5 and 9½ inches in width.

Accordingly, it is an object of the present invention to provide improved film reels, and in particular, improved collapsible film reels.

Another object is to provide improved collapsible film reels which are adapted to be adjustable, for use with various size, in width, films.

Another object is to provide improved collapsible film reels having a disposable core upon which the film can be wound and which can be easily removed, for both storing the film thereon for later use and for disposing of the film without the necessity of rewinding the film.

Still another object is to provide improved collapsible film reels and disposable cores therefor, both of which are adapted to be adjustable, for use with various size, in width, films.

Other objects of the invention will in part be obvious and will in part appear hereinafter.

The above objectives are accomplished with a collapsible film reel having a pair of end plates which are removably affixed to a tubular spool. One of the end plates further is adapted to be positionably adjustable on the spool, with respect to the other one of the end plates so as to provide a spacing therebetween substantially corresponding to a particular size, in width, film.

A disposoble tubular core can be slidably fitted over the spool, after removing one of the end plates. The film is wound on the disposable core and the latter can be easily removed from the spool, for both storing the film thereon for later use and for disposing of the film, without the necessity of rewinding the film. The disposable core is weakened, for example, by perforating it, so as to form at least one annular parting line about its peripheral surface so that the core can be easily separated at the parting lines to adapt it to various size, in width, films.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which:

FIG. 1 is a plan view of the collapsible film reel;

FIG. 2 is a partial sectional view of the spool of the collapsible film reel of FIG. 1;

FIG. 3 is a partial view, along lines 3—3 of FIG. 1, illustrating the lock mechanism for adjustably positioning the one end plate;

FIG. 4 is a partial sectional view, taken along lines 4—4 of FIG. 1;

FIG. 5 is a partial view, along lines 3—3 of FIG. 1, illustrating an alternative lock mechanism for adjustably positioning the one end plate;

FIG. 6 is a plan view of the disposable core;

FIG. 7 is an end view of the disposable core of FIG. 6;

FIG. 8 is a plan view, generally illustrating the manner in which a disposable core is affixed to the spool and the manner in which a film is affixed to the collapsible reel;

FIG. 9 is a partial sectional view, taken along lines 9—9 of FIG. 8;

FIG. 10 is a plan view, illustrating the manner in which a disposable core is separated to adapt it for use with various size, in width, films; and FIG. 11 is a partial perspective view of a portable film reader light table, illustrating the manner in which the collapsible film reel is affixed to it.

Similar reference characters refer to similar parts throughout the several views of the drawings.

Referring now to the drawings, in FIG. 1 there is shown a film reel 10 including a tubular spool 12 and a pair of end plates 14 and 16 removably affixed to the respective ends of the spool 12. The spool 12, as can be best seen in FIG. 2, is closed by means of an end cover 18 having an end wall 20 and a side wall 22 so that the end cover 18 is slidably received and affixed within the interior of the tubular spool 12. The end wall 20 has a key slot 24 (FIG. 3) formed in it for receiving the end of a crank arm such as the crank arm 26 illustrated in FIG. 11 for drivingly coupling the crank arm and the film reel 10 together so that the film reel can be rotated by turning the crank arm. The opposite end of the spool 12 is opened and has at least two L-shaped key lock slots 28 formed in it, extending inwardly from its edge and in diametrically opposed positions. The spool 12 also has a number of apertures such as the apertures 30–34 formed in it, in predetermined spaced relationship, for adjustably positioning the end plate 14 with respect to the end plate 16, in the manner described more fully below.

The end plate 16, as can be best seen in FIGS. 1 and 4, includes a circular shaped disc 36 which is substantially larger in diameter than the spool 12 and which has an annular flange 38 concentrically affixed to it. The flange 38 is of a diameter to be slidably received within the interior of the spool 12 and has a pair of key lock pins 40 affixed to it which are adapted to lockingly engage within the key lock slots 28, to removably secure the end plate 16 to the spool 12, as illustrated in FIG. 1. The key lock pins 40, as can be best seen in FIG. 4, are of a length such that their ends are flush with and do not extend above the surface of the spool 12, so that the key lock pins do not interfere with the film wound on the spool 12. The disc 36 of the end plate 16 also has a key slot like the key slot 24 for receiving a film reel support coupler affixed to, for example, a support arm 42, as illustrated in FIG. 11.

The end plate 14 also includes a circular disc 44 which is preferably of the same diameter as in the disc 36. An aperture (not shown) which is slightly larger than the diameter of the spool 12 is formed in the disc 44 and about the aperture is an annular flange 46. A pin lock assembly 48 (FIG. 3) is affixed to the flange 46 which assembly includes a pin 50 affixed to one end of a resilient leaf spring 52 affixed, by means of fastening means such as a rivet 54 to the flange 46. The pin 50 extends through an aperture 56 in the flange 46 and is adapted to be received within one of the apertures 30–34 in the spool 12. Affixed to the upper end of the pin 50 is a lever arm 58 which is positioned to engage a threaded screw 60 extended through an aperture (not shown) in the leaf spring 52 and affixed to the flange 46. A coil spring 62 is disposed between the enlarged head portion 64 of the threaded screw 60 and the leaf spring 52 so as to bias the latter to engage the pin 50 within one of the apertures 30–34. The pin 50 is withdrawn from the apertures 30–34, by pressing downwardly on the end of the lever arm 58 to engage the head portion 64 of the threaded screw 60. The threaded screw 60 functions as a pivot for the lever arm 58, for lifting the pin 50.

In FIG. 5, there is shown a pin lock assembly 66 which can be used in place of the pin lock assembly 48. The pin lock assembly 66 also includes a pin 50 affixed to one end of a leaf spring 52 affixed to the flange 46 and a threaded screw 60 extended through an aperture (not shown) in the leaf spring and affixed to the flange 46. A coil spring again is disposed between the enlarged head portion 64 of the threaded screw 60 and the leaf spring 52, to bias the pin 50 in an aperture engaging position. In the case of the pin lock assembly 66, a knob 68 is affixed to the end of the pin 50 which knob provides a finger grip for withdrawing the pin 50 from one of the apertures 30–34.

The spool 12 and the end plates 14 and 16 of the film reel 10 are preferably fabricated of a metal such as aluminum so as to provide both a relatively lightweight and sturdy film reel of a permanent, reusable construction.

To assemble the film reel 10, the end plate 16 is affixed to the spool 12 by lockingly engaging the key lock pins 40 within the key lock slots 28 so that the end plate 16 is secured to the spool, in a fixed position. Next, the end plate 14 is affixed to the spool 12 by extending the spool 12 through the aperture in the end plate 14 and by lockingly engaging the pin 50 in one of the apertures 30–34 in the spool 12. It may be noted that the end plate 14 is affixed to the spool 12 with the flange 46 thereof outwardly of the space between the two end plates 14 and 16 so that the flange and the pin lock assembly 48 thereon does not interfere with the film wound on the film reel.

As indicated above, the film reel 10 can be adapted to receive thereon various size, in width, films. This is accomplished by adjustably positioning the end plate 14 with respect to the end plate 16. In the illustrated example, the film reel 10 is adapted to film 9½ inches and 5 inches in width, 70 mm., 35 mm. and 16 mm. film simply by positionably adjusting the end plate 14 to lockingly engage the pin 50 in respective ones of the apertures 30–34 in the spool 12. It is apparent that the film reel 10 also can be adapted to any other size, in width, film simply by providing additional apertures, such as the apertures 30–34, in the spool 12 in appropriately spaced relationship to the end plate 16.

As indicated above, in many cases, particularly when reading photo reconnaissance films, the film is disposed of immediately after it has been read. In the past, the film generally had to be rewound on the supply reel or otherwise removed from the takeup reel since the takeup reels like the film reel 10 are of a permanent construction and not intended to be destroyed. Even in cases where the film is to be retained, the film had to be rewound on the supply reel since the takeup reel formed an integral part of the viewing apparatus. Each of the above disadvantages are overcome by the present invention, by providing a disposable core 70, of the type illustrated in FIG. 6.

The disposable core 70 preferably is fabricated of burnable material such as pressed paperboard, cardboard or a plastic such as polystyrene, cellulose acetate and the like so that the core is lightweight, can be easily and inexpensively manufactured and can be readily destroyed as by burning them.

The disposable cores 70 are of a tubular construction and are adapted to slidably fit over the spool 12 of the film reel 10. The disposable cores 70 also have a width substantially corresponding to the maximum span between the end plates 14 and 16 and can be advantageously just slightly larger in width so that they are wedged between the end plates 14 and 16 and thereby prevented from rotating on the spool 12 as the film reel is rotated. Alternatively, the disposable cores 70 can have apertures 72 formed in them so that a film 74 can be affixed to a core and the core and the film both affixed to the spool 12 by means of masking tape 76 or the like, as illustrated in FIGS. 8 and 9. As illustrated, the end edge of the film 74 is overlapped over a portion of the aperture 72 and a small piece of masking tape 76 is affixed to the film 74 and to that portion of the spool 12 exposed by the aperture 72 so that the film 74 and the core 70 both are effectively affixed to the spool 12 and will be rotated along with the film reel 10 as the latter is rotated.

The cores 70 also are advantageously provided with a number of perforated or otherwise weakened lines such as the lines 78 and 79 which extend annularly about the periphery of the cores. These lines permit the cores 70 to be separated by breaking them along these lines to provide smaller cores of a predetermined width corresponding to the various size, in width, films, that the film reel 10 is adapted to be used with. For example, if the film reel 10 is to be used with a film which is 5 inches in width, a core 70 is broken in half along the weakened lines 78 (FIG. 10) to provide a core of corresponding width. That portion of the core is then slidably inserted over the spool 12 and the end plate 14 is positionably adjusted to blockingly engage the pin 50 in the aperture 31 of the spool 12.

The film, after it has been read, can be easily and quickly removed from the film reel 10 without the necessity of rewinding it simply by removing one of the end plates 14 and 16 and sliding the core 70 off of the spool 12. The film, on the core 70, can be stored for later reading, or alternatively, the film and the core both can be disposed of by burning or otherwise destroying it.

It can be seen from the above description that the film reel 10 satisfies each of the above-mentioned objectives of the invention. It can be further seen that certain changes can be made in the construtcion of the film reel 10, without departing from the concept of the invention. For example, to mention but several of the obvious changes which can be made, it is apparent that both of the end plates can be adapted to be positionably adjustable. In such a case, both ends of the spool 12 would be correspondingly formed to adapt the film reel to support and/or driving means and the apertures such as the apertures 30-34 formed in the spool in appropriate positions. The disc portions 36 and 44 of the respective end plates 16 and 14 are preferably circular-shaped, however, they need not be. Also, while shown to be of a solid construction, the disc 36 and 44 also can be cut-away over the major portion thereof, to provide a still lighter-in-weight film reel.

It will thus be seen that the objects set forth above, among those made apparent from the preceding description, are efficiently attained and, since certain changes may be made in the above construction without departing from the scope of the invention, it is intended that all matter conained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A collapsible film reel comprising, in combination: a tubular spool adapted to have a continuous length of film wound thereon and to be drivingly coupled to driving means for rotating it, a pair of end plates each including disc means larger than said spool, one of said end plates being removably affixed in a fixed position at one end of said spool and the other one of said end plates having an aperture therein for extending said spool through it and being adjustably positionable on said spool with respect to the fixed one of said end plates, a plurality of positionably spaced lock means on said spool, a locking assembly affixed to the movable one of said end plates releasably engageable in respective ones of said lock means to positionably space and to lock said movable end plate a spaced distance from the fixed one of said end plates.

2. The collapsible film reel of claim 1, further including a tubular core adapted to slidably fit over said spool and to have film wound thereon, whereby the film can be removed from the film reel by removing one of the end plates and sliding the core off of the spool.

3. The collapsible film reel of claim 2, wherein said tubular core is fabricated of a disposable, fusible material.

4. The collapsible film reel of claim 2, wherein said tubular core is weakened along at least one line extending annularly about its periphery, said core being breakable along said weakened line to adapt said core to said film reel when said end plate is adjustably positioned to vary the distance between said end plates.

5. The collapsible film reel of claim 2 wherein said tubular core has at least one aperture therein, whereby masking tape and the like can be affixed to said core in overlapping relationship with the aperture therein and to the portion of the spool exposed by the aperture to affix the core to the spool.

6. A collapsible film reel comprising, in combination: a tubular spool adapted to have a continuous length of film wound thereon and to be drivingly coupled to drive means for rotating it, a pair of end plates each larger than said spool, one of said end plates being removably affixed in a fixed position at one end of said spool and the other one of said end plates having an aperture therein for extending said spool through it and being adjustably positionable on said spool with respect to the fixed one of said end plates, a tubular core adapted to slidably fit over said spool and to have film wound thereon, said core being formed to permit said core to be divided to fit said core between the end plates and any one of the adjusted positions, whereby the film reel can be collapsed for storage and transportation and can be adjustably adapted for use with various size, in width, film.

References Cited

UNITED STATES PATENTS

| 1,143,143 | 6/1915 | Schoen | 242—71.9 |
| 2,012,102 | 8/1935 | Johnstone | 242—68.5 |
| 2,127,772 | 8/1938 | Horn et al. | |
| 2,207,615 | 7/1940 | Crandall. | |
| 2,362,577 | 11/1944 | Mihalyi et al. | 242—71.9 |
| 3,363,854 | 1/1968 | Becker | 242—71.9 X |

NATHAN L. MINTZ, *Primary Examiner.*